(12) United States Patent
Healey

(10) Patent No.: US 7,456,119 B2
(45) Date of Patent: Nov. 25, 2008

(54) COMPOSITES

(75) Inventor: Michael J Healey, Merdon-la-Floret (FR)

(73) Assignees: Bae Systems PLC, London (GB); Devold AMT AS, Langevag (NO)

( * ) Notice: Subject to any disclaimer, the term of this patent is extended or adjusted under 35 U.S.C. 154(b) by 787 days.

(21) Appl. No.: 10/250,360

(22) PCT Filed: Jan. 9, 2002

(86) PCT No.: PCT/GB02/00053

§ 371 (c)(1),
(2), (4) Date: Jul. 1, 2003

(87) PCT Pub. No.: WO02/057067

PCT Pub. Date: Jul. 25, 2002

(65) Prior Publication Data

US 2004/0072490 A1 Apr. 15, 2004

(30) Foreign Application Priority Data

Jan. 19, 2001 (GB) ................................. 0101360.6

(51) Int. Cl.
*B32B 5/26* (2006.01)
(52) U.S. Cl. ........................ 442/381; 442/352; 442/354; 442/355; 442/366; 442/391; 442/392; 428/105; 428/107; 428/113

(58) Field of Classification Search ................. 442/352, 442/354, 355, 366, 381, 391, 392; 428/105, 428/107, 113
See application file for complete search history.

(56) References Cited

U.S. PATENT DOCUMENTS

| | | | | | |
|---|---|---|---|---|---|
| 3,538,564 | A | * | 11/1970 | Skoler et al. | 28/109 |
| 3,627,604 | A | * | 12/1971 | Davies et al. | 156/148 |
| 3,631,666 | A | * | 1/1972 | Kim | 57/6 |
| 3,946,548 | A | * | 3/1976 | Hino et al. | 57/247 |
| 4,141,122 | A | * | 2/1979 | Trifunovic | 28/271 |
| 4,302,929 | A | * | 12/1981 | Bauer et al. | 57/247 |
| 4,477,526 | A | * | 10/1984 | Lauterbach | 428/399 |
| 4,829,761 | A | * | 5/1989 | Phillips et al. | 57/248 |
| 5,055,242 | A | * | 10/1991 | Vane | 264/463 |
| 5,503,928 | A | * | 4/1996 | Cheshire | 428/357 |
| 6,035,621 | A | * | 3/2000 | Scheerer et al. | 57/224 |
| 6,265,333 | B1 | * | 7/2001 | Dzenis et al. | 442/346 |

* cited by examiner

*Primary Examiner*—Norca Torres-Velazquez
(74) *Attorney, Agent, or Firm*—Nixon & Vanderhye P.C.

(57) ABSTRACT

This invention relates to a composite laminate, a layup and preform for such a composite laminate and to a method of manufacturing the composite laminate. The layup (28), preform and composite laminate (22) include at least one ply (20) which includes hairy yarn (10). The action of the hairy yarn (10) is to provide cross ply linking owing to the extension of fibers from the hairy yarn into spaces both within the ply and between the plies. The addition of resin matrix material (26) to layup provides a firm cross ply linkage to the composite laminate.

20 Claims, 2 Drawing Sheets

COMPOSITES

This application is the U.S. national phase of international application PCT/GB02/00053, filed 9 Jan. 2002, which designated the U.S.

The invention relates to composites and is particularly concerned with a composite with improved through-thickness properties.

It is known to produce composite laminates by laying several plies of fabric into a stack of required thickness. The fabrics may be of a non-crimped or warp-knitted type. The fabrics may be unidirectional (fibres in a single orientation) or more typically multi-axial. The term "multi-axial" means that alternate plies of fibre will be constructed in several different directions to produce a fabric with optimum strength and stiffness in required directions. Commonly used directions are 0°, +45°, −45° and 90°. Normally the 0° plies are in the warp direction and the 90° plies in the weft direction, but other layers may contain fibres of different angles, typically +60° or −60°. The term "non-crimp" refers to fabrics where one or multiple layers of fibres are laid upon each other and transformed into a fabric by stitching or application of a binder such that the fibres remain straight and without substantial crimp. As well as offering performance advantages relative to traditional woven materials, non-crimp fabrics may be cheaper to produce per unit mass and faster to manufacture. Such composites have potential for use in production of wing skins for example.

Such composites can however experience poor through-thickness properties owing to no, or limited, fibre reinforcement in this direction.

It is also known to produce carbon yarn formed from many short fibres spun together. This produces a yarn with numerous short lengths of fibre protruding out from the main orientation of fibres, and will be referred to in the application as a "hairy" yarn. It is also known in the art to use the yarn in the production of woven and non-woven fabrics which have improved interlaminar shear strengths and cross-ply tensile properties, as a consequence of through-thickness property improvements associated with the short fibres. One such example of a non-woven fabric for use only as a textile is included in U.S. Pat. No. 3,358,564. In this fabric non-woven adjacent layers of hairy yarn are "needled" to adhere them together.

Woven fabrics employing hairy yarns do not however have the in-plane properties of non-woven or non crimp fabrics, tensile strength for example being generally lower.

The present application is concerned with a non-woven composite having improved through thickness properties, shear strength and damage tolerance.

According to a first aspect of the invention there is provided a composite laminate including a layup of plies in which at least one ply is non-woven and includes a "hairy" yarn.

Fibres of each ply used in the composite may be constructed in several different directions. In the present application they are preferably 0°, +45°, −45° and 90°.

The method may include constructing the plies from groups of fibres which, in each ply, run parallel with each other. Such groups are known as tows. In such a case the method may include producing the plies by substitution of a percentage of the tows by the hairy yarn.

The plies may comprise from 0.5% to 90% hairy yarn by mass of fibre. More preferably, the plies comprise from 2% to 20% hairy yarn by mass of fibre. The preferred fibre form is non crimp fabric, but the approach is equally applicable to UD, braids or 3-dimensional preforms.

The hairy yarn may be constructed from short lengths of broken and twisted carbon fibre or alternatively from glass, Kevlar®, PBO or other suitable material.

Preferably, the yarn is only constructed from a single material, but may also be constructed from two or more materials.

Preferably, the method includes arranging the hairy yarn such that the short lengths of fibre protruding out from the rain orientation of the fibres of the hairy yarn in one ply interact with those in another, especially where hairy yarn in one ply crosses-over hairy yarn in another. When the plies are cured in the bonding matrix, the interaction between the hairy yarn in adjacent plies strengthens the bond between the plies, i.e. improves the through-thickness properties.

According to a second aspect of the invention there is provided a method of producing a composite laminate including forming a layup of plies, at least one of which is non-woven and includes a hairy yarn, applying to the layup a bonding matrix and hardening the matrix to form the composite laminate.

Preferably, all of the plies include hairy yarn.

A composite in accordance with the invention will now be described by way of example and with reference to the accompanying drawings in which.

Figure 1:
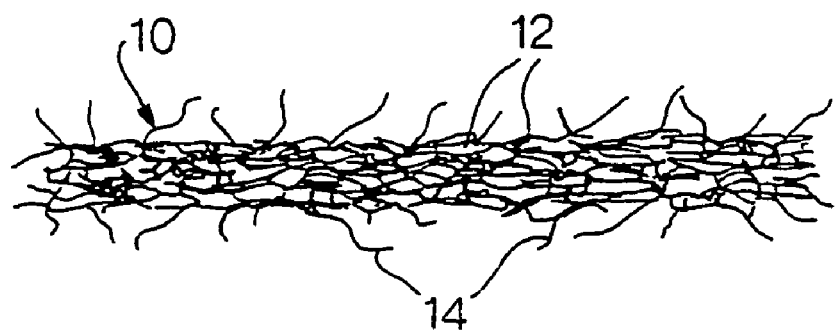
FIG. 1 is a schematic view of a hairy yarn.

Referring to FIG. 1, a hairy yarn 10 is produced from many short carbon fibres 12 twisted or spun together, or even held together by a binder. This produces a yarn 10 with numerous short lengths of carbon fibre 14 protruding out from the main orientation of the fibres.

Figure 2:
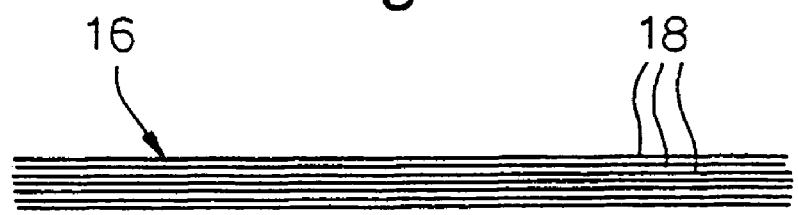
FIG. 2 is a schematic view of a tow.
Figure 3:
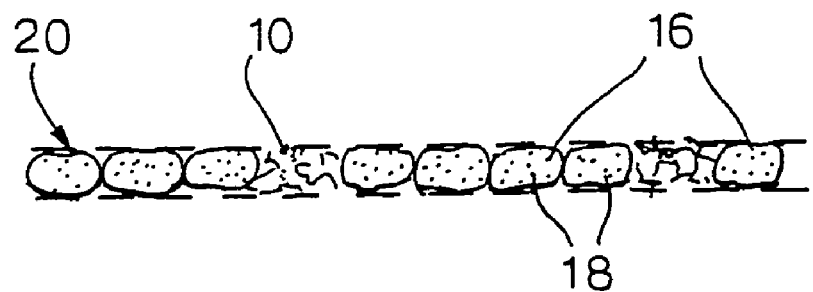
FIG. 3 is a section through a ply for use in a method in accordance with the invention.

Referring to FIGS. 2 and 3, a tow 16 comprises groups of fibres 18. The fibres 18 are aligned such that they run parallel with each other In each layer of the fabric (whether non-crimp fabric or unidirectional prepregnated tape). The tows 16 are used to produce warp dominated plies 20 (see FIG. 3) (0° ply) and weft dominated plies (not shown) (+45°, −45° and 90° plies). Combination of these materials creates a multi-axial lay-up with strands of hairy yarn 10 substituted for certain tows 16 (as shown in FIG. 3). Examples of warp and weft dominated plies are described in EP-A-0826488 to which the reader is directed for details.

In FIG. 3 the ply 20 contains from 0.5% to 10% hairy yarn 10 by mass of fibres.

Figure 4:
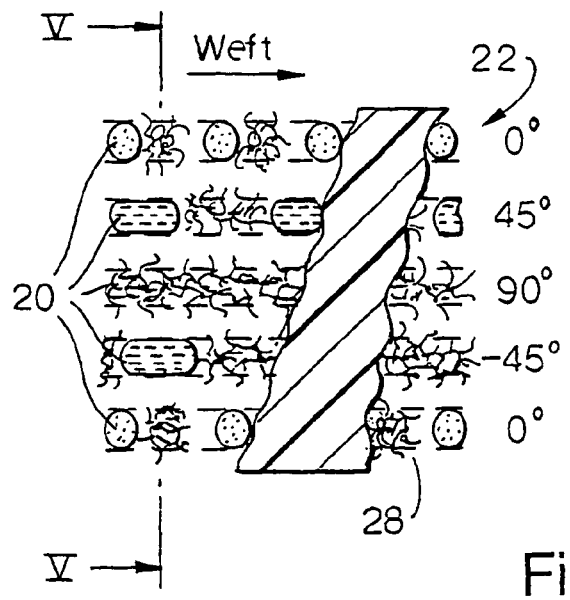
FIG. 4 is a section through a layup of plies showing plies which make up a composite laminate, the plies being separated for clarity.
Figure 5:
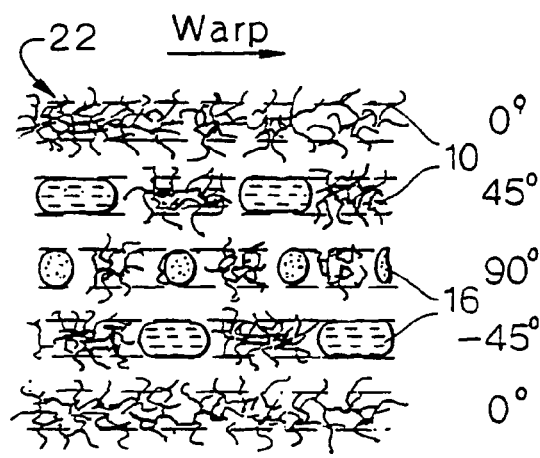
FIG. 5 is a section taken on the line V-V of FIG. 4.

The plies 20 are laid on top of each other in a predetermined order to produce a layup 28. The individual plies of the layup 28 can be seen In FIGS. 4 and 5.

Figure 6:
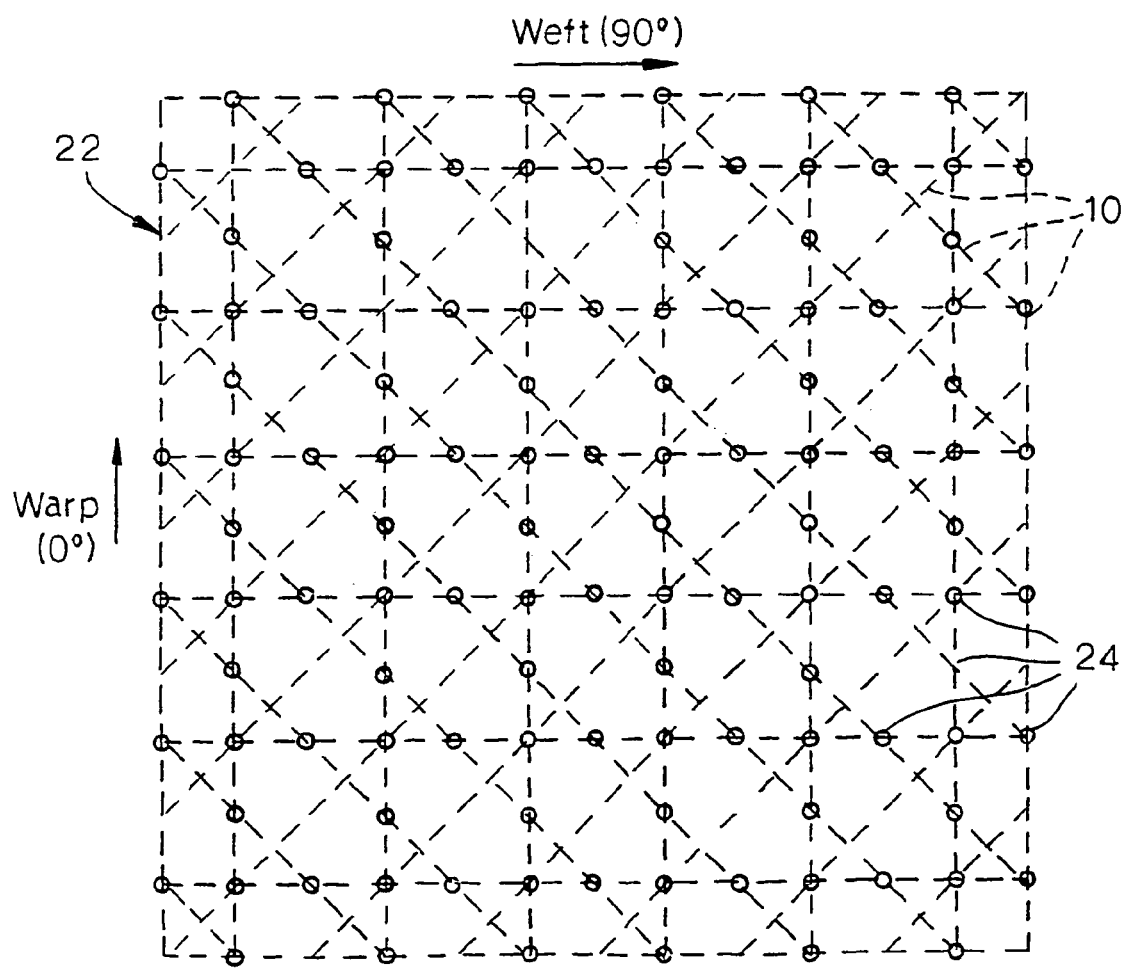
FIG. 6 is a plan view of a laminate showing hairy yarn within each of the plies.

In the layup 28, the short lengths of fibre 14 protruding out from the main orientation of the fibres of the hairy yarn 10 in one ply 20 interact with those in another, especially where hairy yarn 10 in one ply 20 'crosses-over' 24 hairy yarn 10 in another, as shown in FIG. 6.

The piles are cured in a resin matrix 26 (see FIG. 4), the interaction between the hairy yarn 16 in adjacent plies strengthens the bond between the plies, i.e. improves the through-thickness properties and damage tolerance as the hairy yarn structure will additionally act as a "crack-stopper".

It will be noted that as the yarn 10 in one ply 14 interacts with adjacent plies the improved through-thickness properties extend throughout the full thickness of the composite laminate so long as overlapping hairy yarns occur in each layer. This improves the damage tolerance of the composite and acts as a means of preventing propagation of cracks within the composite. The through-thickness properties are especially improved at the crossover points 24.

The laminate 22 is a non-crimp fabric which is particularly suitable for use in the production of skins for aircraft.

The invention claimed is:

1. A composite laminate comprising a layup of fibre plies bonded in a matrix material, wherein at least one fibre ply is of non-woven fibres and said at least one fibre ply including at least one hairy yarn.

2. A composite laminate according to claim 1 in which each of the non-woven plies includes a hairy yarn.

3. A composite laminate according to claim 1 in which the non-woven plies comprise from 0.5% to 90% hairy yarn by mass of fibres.

4. A composite laminate according to claim 3 in which the non-woven plies comprise from 2% to 20% hairy yarn by mass of fibre.

5. A composite laminate according to claim 1 in which the hairy yarn is constructed from fibres of one or more materials spun or twisted together or bound together by means such as resin.

6. A composite laminate according to claim 5 in which the hairy yarn is constructed from fibres of carbon, glass, aramid or PBO.

7. A composite laminate according to claim 1 in which the plies are formed from tows and in which strands of hairy yarn are substituted for tows.

8. A composite laminate according to claim 1 in which fibres of each ply used in the composite are arranged in directions of 0° and ±20° to 90°.

9. A composite laminate according to claim 7 in which the fibres are arranged in directions of 0°, +45°, −45°, and/or 90°.

10. A method of producing a composite laminate comprising the steps of:

forming a layup of fibre plies, at least one of said fibre plies is non-woven and includes a hairy yarn,
applying to the layup a bonding matrix, and
hardening the matrix to form the composite laminate.

11. A composite laminate comprising a layup of fibre plies bonded in a matrix material, wherein at least one fibre ply is of non-woven fibres and said at least one fibre ply including at least one hairy yarn, wherein the hairy yarn is arranged such that short lengths of fibre protruding out from the main orientation of the fibres of the hairy yarn in one ply interact with those in another ply.

12. A composite laminate according to claim 11 in which each of the non-woven plies includes a hairy yarn.

13. A composite laminate according to claim 11 in which the non-woven plies comprise from 0.5% to 90% hairy yarn by mass of fibres.

14. A composite laminate according to claim 13 in which the non-woven plies comprise from 2% to 20% hairy yarn by mass of fibre.

15. A composite laminate according to claim 11 in which hairy yarn in one ply crosses over hairy yarn in another.

16. A composite laminate according to claim 11 in which the hairy yarn is constructed from fibres of one or more materials spun or twisted together or bound together by means such as resin.

17. A composite laminate according to claim 16 in which the hairy yarn is constructed from fibres of carbon, glass, aramid or PBO.

18. A composite laminate according to claim 11 in which the plies are formed from tows and in which strands of hairy yarn are substituted for tows.

19. A composite laminate according to claim 11 in which fibres of each ply used in the composite are arranged in directions of 0° and ±20° to 90°.

20. A composite laminate according to claim 18 in which the fibres are arranged in directions of 0°, +45°, −45°, and/or 90°.

* * * * *